May 1, 1956     L. W. BURTON ET AL     2,744,218

SEALED RECTIFIER UNIT AND METHOD OF MAKING THE SAME

Filed Dec. 21, 1954

Inventors:
Lester W. Burton
Stuart P. Jackson
by, *Richard E. Hosley*
Their Attorney

United States Patent Office 2,744,218
Patented May 1, 1956

2,744,218

SEALED RECTIFIER UNIT AND METHOD OF MAKING THE SAME

Lester W. Burton, Danvers, and Stuart P. Jackson, Lynn, Mass., assignors to General Electric Company, a corporation of New York Application December 21, 1954, Serial No. 476,724

10 Claims. (Cl. 317—234)

Our invention relates to rectifier units of the type having sealed enclosures for the rectifier cell.

Metallic rectifier cells are sensitive to temperature, pressure resulting from mechanical stresses, and certain deleterious agents present in the atmosphere such as moisture, corrosive fumes, dirt and the like. It has consequently been proposed to enclose these cells in suitable containers which will protect them from atmospheric agents and at the same time provide adequate cooling of the cell and mechanical protection thereof against the application of destructive pressures. Monocrystal semiconductors having a rectifier barrier layer of the P-N type, such as found in germanium and silicon rectifier cells, are extremely sensitive in this respect. Consequently, the mounting and enclosure of such a cell must be made under conditions which will not result in its destruction due to the temperatures and pressures employed in fabricating it into a rectifier unit. Irrespective of the type of cell used it is also desirable to provide an assembly which is simple, uses few parts, gives optimum cooling, and provides protection against pressure and atmospheric agents, and which as a unit can be mounted easily in multi-cell combinations.

It is consequently an object of our invention to provide an improved construction for a rectifier unit of the sealed type and a method of making the same.

It is also an object of our invention to provide an enclosed type rectifier unit which is of simple construction and furnishes a hermetic sealing of the rectifier cell within an enclosure having terminal and mounting projections for the cell and an arrangement of parts which insures an adequate cooling of the cell.

It is a further object of our invention to provide such a unit which is particularly suited for mounting and enclosing monocrystal semiconductors of the broad area P-N junction type.

Further objects and advantages of our invention will become apparent from the following description of the embodiments thereof shown in the accompanying drawing and of the method of manufacturing these embodiments.

Figures 1, 2:
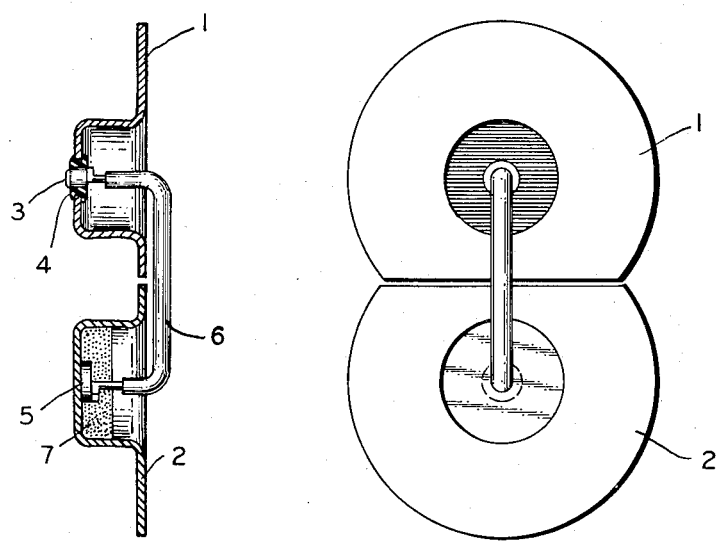
Figures 3, 4:
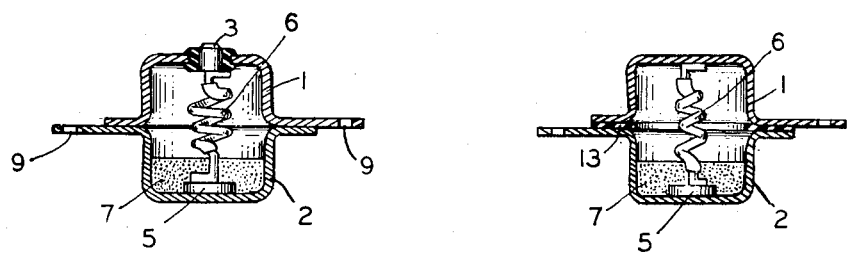
Figure 5:
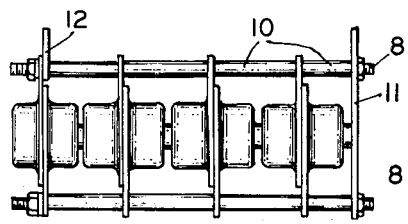

In the drawing, Figs. 1 and 2 are respectively side sectional and plan views of an intermediate assembly of the parts which is made before the final assembly which produces the structure shown in Figs. 3 and 4, and Fig. 5 is a view showing one multi-cell assembly of the units shown in Fig. 3.

In accordance with one embodiment of our invention a sealed enclosure for a rectifier cell is formed of a pair of metallic cups each of which has a flanged rim and one of which has a contact member extending through an opening in the end wall structure thereof to which it is sealed by a body of insulating material interposed between and bonded to the adjacent walls of said contact and said opening. These cups are positioned adjacent one another with the cavities therein exposed and one surface of a rectifier cell is attached to the inside surface of the cup not provided with the contact member. One terminal of a flexible conductor electrically insulated along its length is attached to the other surface of the cell and the other terminal of this conductor is attached to the inside surface of the contact member in the other cup. These attachments must be electrically conductive and will usually be made with a solder or like bonding metal or alloy. A potting compound is then applied in the cup in which the rectifier cell is mounted to a depth sufficient to enclose the cell and the terminal portion of the conductor attached thereto. The cups are then assembled with the cavities therein opposite one another and with their flanged rims in contact with one another. The excess length of the conductor is crowded within the enclosure formed by this assembly of the cups by coiling, kinking, folding or otherwise shortening the length between its terminals. The flanged rims of the cups are then joined to one another by welding, soldering or the use of a plastic bond to form a sealed enclosure for the rectifier cell.

Any imperfect joinder of the flanges of the cups which might permit the entrance of the moisture or other agent of the atmosphere into the cell enclosure is nullified in great measure by the potting compound which completely encloses the cell. Furthermore this potting compound is effective in relieving the cell of any mechanical strains that might be applied thereto during the manufacturing process by which the components are assembled into their final form. If a plastic seal is employed for joining the flanges of the caps forming the cell enclosure, a drying agent such as silica gel may be placed in one of the cups before they are closed on to one another to form the final assembly. Some plastic bonds will transmit a small amount of moisture and the drying agent thus provided will neutralize this intrusion of moisture into the cell enclosure or capsule formed by the assembly of the cups.

Since the contact area of one side of the cell is in engagement with one of the metal cups, adequate cooling of the cell is thus provided and where the two cups are welded to one another in making the assembly the additional radiating surface of the second cup is also provided. Where the cups are joined by an electrically insulating bonding material, their flanged rims may be made of unequal peripheral extension so that when they are assembled the wider portion of one rim may be brought to an overlapping engagement with the narrower portion of the other rim to provide thereby spaced terminal and mounting projections each of which is individual to one of the cups forming the enclosing capsule for the rectifier cell. When the cup rims are joined by welding or soldering, the cups may also have rims of unequal peripheral extension assembled in the way just described since the resulting structure will provide a capsule having a substantially uniform circumferential heat radiating fin such as would be obtained by using cups with rims of uniform width.

In the arrangement shown in Figs. 1, 2 and 3 of the drawing, metallic cups 1 and 2 having flanged rims of unequal peripheral extension are assembled as shown in Figs. 1 and 2 with the narrower portions of the rims adjacent one another and with the cavities therein exposed. It is to be noted that cup 1 has a contact member 3 extending through an opening in the end wall structure thereof to which it is sealed by a body of insulating material 4 interposed between and bonded to the adjacent walls of this contact and the opening in cup 1 in which it is mounted in order to obtain a good hermetic seal between the contact 3 and the wall structure of cup 1. The insulating material may be formed of a ceramic or glass like material in accordance with procedures well known in the art for making such "glass-to-metal" seals. Cup 1 with its through contact 3 may be prepared at the high temperatures required for forming the hermetic seal so that in making the cell assembly the rectifier cell will not be exposed to these temperatures.

A rectifier cell 5 is attached along one of its contact surfaces to the inner end wall of cup 2 in a central position relative to the side walls of the cup. Thereafter one terminal of a flexible conductor 6 is electrically joined to the other surface of the rectifier cell and the other terminal of this conductor is attached to the inside surface of the contact member 3 in cup 1. The length of this conductor is reduced by reason of the unequal peripheral extension of the flanged rims of the cups and their assembly with the narrower portions thereof adjacent one another as shown in Figs. 1 and 2. Conductor 6 is electrically insulated throughout its length except for the terminals thereof and this insulation may be of any suitable type but it is preferably in the form of a lacquer or enamel so as to decrease the physical size of the conductor. The terminal of the conductor which is brought into engagement with one of the contact surfaces of the rectifier cell 5 is preferably flattened in order to provide a wide area of contact between it and the end of the contact surface of the rectifier cell which it engages.

When using a monocrystal semiconductor having a P-N junction such as occurs in germanium and silicon rectifier cells the solder employed for attaching the cell to cup 2 and to one terminal of conductor 6 must be such as not to destroy the rectifying characteristics of the cell. We prefer to use a conductor 6 formed of nickel, iron, copper or the like and to join the terminal thereof to one contact surface of the cell by an indium solder. Consequently, the other contact surface of the rectifier cell must be joined to cup 2 by a solder which will not produce P-type material therein. We prefer to use a tin-arsenic solder for this purpose.

A potting compound 7 is then applied in the cavity of cup 2 to a depth sufficient to enclose cell 5 and all or most of the bared terminal portion of conductor 6. The cups are then assembled as shown in Fig. 3 with the cavities therein facing one another and with the wider portion of the rim of one cup overlapping the narrower portion of the rim of the other cup. The excess length of conductor 6 is coiled, twisted, crimped or otherwise treated to crowd it in the enclosure formed by the cavities in the cups. These flanges are then joined to one another by soldering, brazing, welding or the like to complete the sealed enclosure for the rectifier cell. Resistance welding is preferred for this operation.

If the wider portions of the rims of the respective metallic cups are diametrically opposed to one another, they form convenient mounting projections for supporting the cell in assemblies requiring more than one of these cells. One such arrangement is shown in Fig. 5 where four cells are connected in end-to-end engagement with one another and held in position by bolts 8 which extend through openings 9 in each of the flanged cup rims. Each rectifier unit is insulated from the other rectifier units by providing an insulating sleeve and spacing members 10 mounted on these bolts. A plate 11 at one end of the assembly in electrical engagement with contact 3 of one of the end cells and a terminal 13 engaging the rim structure of the other end cell provide terminal connections for the four cells illustrated which are connected in series circuit with one another.

It is of course not necessary to assemble the metallic cups by means of a metallic bond between their flanged rims as described above. This assembly may be made by an electrically insulating plastic material having good bonding characteristics with metal. When such a material is used in forming the enclosure for the cell, a film 13 thereof as shown in Fig. 4 separates and electrically insulates the cup members 1 and 2. Such an assembly makes it possible to attach the other end of the conductor 6 directly to the inside surface of cup 1 so that each cup is connected to one contact surface of the rectifier cell 5. The wider portion of each of the metallic cups 1 and 2 thus constitutes not only a mechanical support means for the assembly but also an electrical terminal means therefor.

When employing the contact shown in Fig. 4, it may be desirable to add in one of the cups prior to final assembly a small amount of a drying agent such as silica gel. This material will readily absorb the extremely small amounts of moisture that might be transmitted through the plastic sealing film 13 located between the flanged rims of the cups forming the cell enclosure or capsule. Of course the potting compound 7 also functions to keep moisture away from the cell.

The sealed rectifier unit provided in accordance with our invention is admirably suited for mounting "dot" type monocrystal semiconductor P-N junction devices formed of germanium, silicon, and the like. These dot types are broad area P-N junction type cells suitable for handling currents of from 1 to 50 amperes. In the case of cells formed of a chip of germanium of about 3/16 inch in width, the current transmitting capabilities are about 15 amperes. Of course aside from cooling, this capacity depends in large measure on the surface area of the indium dot engaging one of the contact surfaces of the germanium chip. It is for this reason that the terminal of the conductor 6 is preferably flattened or broadened so as to spread out the indium solder connection between it and one surface of the germanium chip. It is of course obvious that such flattened terminals need not be employed, for the conductor might be inserted in the hemispherical globule of indium which makes a surface engagement with the germanium throughout an area depending on the size of the globule.

Obviously our invention is not limited to sealed rectifier units mounting rectifier cells having P-N junctions of the monocrystal semiconductor type above specifically described. Rectifier cells embodying other physical constructions having like barrier layers may be substituted for the described germanium rectifier cell. Examples of such rectifiers are the selenium and copper oxide cells which are employed extensively as metallic rectifiers and which may require sealed protection against pressure, surrounding atmospheric media, and heat produced by operation of the cell.

It is also obvious that the particular configurations of the component parts forming the enclosing capsule for the cell may be variously modified and that the manufacturing steps employed in fabricating the rectifier unit may be performed in an order different from that above given in describing the embodiments of our invention shown in the drawing.

In the above description of our invention we have not specifically identified the composition of the potting compound or of the bonding plastic which we employ. It is obvious that any suitable material having the desired characteristics may be employed and the selection of such a material is within the knowledge of those skilled in the art. We prefer to use an epoxide resin because of its desirable characteristics including excellent adhesion to metals, high dielectric strength, low moisture absorption, low shrinkage, and high temperature stability. It is of course obvious that other natural or artificial resins may be suited therefor.

Thus while we have described certain preferred embodiments of our invention by way of illustrating its characteristic features, the above and other modifications will occur to those skilled in the art and we therefore intend in the appended claims to cover all such modifications which fall within the true spirit and scope of our invention.

What we claim as new and desire to secure by Letters Patent of the United States is:

1. A rectifier unit comprising a capsule formed of metallic cups having flanged rims of unequal peripheral extension assembled with the cavities therein facing one another and with the wider portion of one rim overlapping the narrower portion of the other rim to provide externally of said capsule spaced terminal and mounting projections individual to each of said cups, a layer of insulating material between and bonded to the overlapping opposed faces of said flanged rims to form a sealed enclosure in said capsule formed by the cavities in said cups, a rectifier cell having one of its contact surfaces mounted on and electrically connected to one of the inside surfaces of one of sad cups, an electrical conductor insulated along its length and having bare terminals one of which is electrically connected to the other contact surface of said cell and the other of which is connected to an inside surface of the other of said cups, and a potting compound within said one of said cups and totally enclosing said rectifier cell mounted therein and the end portion of said conductor attached to said cell.

2. A rectifier unit comprising a capsule formed of metallic cups having flanged rims of unequal peripheral extension assembled with the cavities therein facing one another and with the wider portion of one rim overlapping the narrower portion of the other rim to provide externally of said capsule spaced terminal and mounting projections individual to each of said cups, a layer of insulating material between and bonded to the overlapping opposed faces of said flanged rims to provide a sealed enclosure in said capsule formed by the cavities in said cups, a drying agent within said sealed enclosure of said capsule, a rectifier cell having one of its contact surfaces mounted on and electrically connected to one of the inside surfaces of one of said cups, an electrical conductor insulated along its length and having bare terminals one of which is electrically connected to the other contact surface of said cell and the other of which is connected to an inside surface of the other of said cups, and a potting compound within said one of said cups and totally enclosing said rectifier cell mounted therein and the end portion of said conductor attached to said cell.

3. A rectifier unit comprising a sealed capsule formed of metallic cups having flanged rims joined to one another with the cavities in said cups facing one another, a contact member extending through an opening in the end of the wall structure of one of said cups and sealed in said opening by a body of insulating material interposed between and bonded to the adjacent walls of said contact and said opening, a rectifier cell having one of its contact surfaces mounted on and electrically connected to the inside surface of the other of said cups, an electrical conductor insulated along its length and having bare terminals one of which is electrically connected to the other contact surface of said cell and the other of which is connected to the inside surface of said contact member, and a potting compound within said other of said cups and totally enclosing said rectifier cell mounted therein and the end portion of said conductor attached to said cell.

4. A rectifier unit comprising a sealed capsule formed of metallic cups having flanged rims joined to one another with the cavities in said cups facing one another to form a sealed enclosure, a drying agent in said enclosure formed by the cavities in said cups, a contact member extending through an opening in the end wall structure of one of said cups and sealed in said opening by a body of insulating material interposed between and bonded to the adjacent walls of said contact and said opening, a rectifier cell having one of its contact surfaces mounted on and electrically connected to the inside surface of the other of said cups, an electrical conductor insulated along its length and having bare terminals one of which is electrically connected to the other contact surface of said cell and the other of which is connected to the inside surface of said contact member, and a potting compound within said other of said cups and totally enclosing said rectifier cell mounted therein and the end portion of said conductor attached to said cell.

5. A rectifier unit comprising a capsule formed of metallic cups having flanged rims of unequal peripheral extension assembled with the cavities therein facing one another and with the wider portion of one rim overlapping the narrower portion of the other rim to provide spaced mounting projections individual to each of said cups, a sealed joint between the overlapping opposed faces of said flanged rims to provide a sealed enclosure in said capsule formed by the cavities in said cups, a contact member extending through an opening in the end of the wall structure of one of said cups and sealed in said opening by a body of insulating material interposed between and bonded to the adjacent walls of said contact and said opening, a rectifier cell having one of its contact surfaces mounted on and electrically connected to the inside surface of the other of said cups, an electrical conductor insulated along its length and having bare terminals one of which is electrically connected to the other contact surface of said cell and the other of which is connected to the inside surface of said contact member extending through the end wall structure of said one of said cups, and a potting compound within said other of said cups and totally enclosing said rectifier cell mounted therein and the end portion of said conductor attached to said cell.

6. The method of forming a sealed enclosure for a rectifier cell which comprises the steps of positioning a pair of metal cups having flanged rims of unequal peripheral extension with the narrower portions thereof adjacent one another, attaching one surface of a rectifier cell to the inside surface of one of said cups, attaching one terminal of a flexible conductor electrically insulated along its length to the other surface of said cell, applying a potting compound in said one of said cups to a depth sufficient to enclose said cell and the terminal portion of said conductor attached to said other of its contact surfaces, attaching the other terminal of said flexible conductor to the inside surface of said other of said cups, assembling said cups with the wider portion of one rim overlapping the narrower portion of the other rim and with the excess length of said conductor crowded within the enclosure formed by said cups, and joining the flanged areas of said cups to one another to complete said sealed enclosure for said rectifier cell.

7. The method of forming a sealed enclosure for a rectifier cell which comprises the steps of positioning a pair of metal cups having flanged rims of unequal peripheral extension with the narrower portions thereof adjacent one another, attaching one surface of a rectifier cell to the inside surface of one of said cups, attaching one terminal of a flexible conductor electrically insulated along its length to the other surface of said cell, applying a potting compound in said one of said cups to a depth sufficient to enclose said cell and the terminal portion of said conductor attached to said other of its contact surfaces, attaching the other terminal of said flexible conductor to the inside surface of said other of said cups, placing a drying agent in one of said cups, assembling said cups with the wider portion of one rim overlapping the narrower portion of the other rim and with the excess length of said conductor crowded within the enclosure formed by said cups, and joining the flanged areas of said cups to one another by bonding to their facing surfaces a layer of insulating material.

8. The method of forming a sealed enclosure for a rectifier cell which comprises the steps of providing a pair of metal cups having flanged rims, positioning said cups adjacent one another with the cavities therein exposed, attaching one surface of a rectifier cell to the inside surface of one of said cups, attaching one terminal of a flexible conductor electrically insulated along its length to the other surface of said cell, applying a potting compound in said one of said cups to a depth sufficient to enclose said cell and the terminal portion of said conductor attached to said other of its contact surfaces, attaching the other terminal of said flexible conductor to the inside surface of said other of said cups, placing a drying agent in one of said cups, assembling said cups with the cavities therein opposite one another and their said flanged rims facing one another and with the excess length of said conductor crowded within the enclosure formed by said assembly of said cups, and joining the flanged areas of said cups to one another by bonding to their facing surfaces a layer of insulating material.

9. The method of forming a sealed enclosure for a rectifier cell which comprises the steps of providing a pair of metallic cups each of which has a flanged rim and one of which has a contact member extending through an opening in the end wall structure thereof to which it is sealed by a body of insulating material interposed between and bonded to the adjacent walls of said contact and said opening, positioning said cups adjacent one another with the cavities therein exposed, attaching one surface of a rectifier cell to the inside surface of said other of said cups, attaching one terminal of a flexible conductor electrically insulated along its length to the other surface of said cell, applying a potting compound in said other of said cups to a depth sufficient to enclose said cell and the terminal portion of said conductor attached to said other of its contact surfaces, attaching the other terminal of said flexible conductor to the inside surface of said contact member, assembling said cups with the cavities therein opposite one another and their said flanged rims in contact with one another and with the excess length of said conductor crowded within the enclosure formed by said assembly of said cups, and joining said flanged rims of said cups to one another to complete said sealed enclosure for said rectifier cell.

10. The method of forming a sealed enclosure for a rectifier cell which comprises the steps of providing a pair of metallic cups each of which has a flanged rim of unequal extension and one of which has a contact member extending through an opening in the end wall structure thereof to which it is sealed by a body of insulating material interposed between and bonded to the adjacent walls of said contact and said opening, positioning said cups with the narrower portions thereof adjacent one another, attaching one surface of a rectifier cell to the inside surface of said other of said cups, attaching one terminal of a flexible conductor electrically insulated along its length to the other surface of said cell, applying a potting compound in said other of said cups to a depth sufficient to enclose said cell and the terminal portion of said conductor attached to said other of its contact surfaces, attaching the other terminal of said flexible conductor to the inside surface of said contact member extending through the end wall of said one of said cups, assembling said cups with the wider portion of one rim overlapping the narrower portion of the other rim and with the excess length of said conductor crowded within the enclosure formed by said assembly of said cups, and joining the flanged areas of said cups to one another to complete said sealed enclosure for said rectifier cell.

References Cited in the file of this patent
UNITED STATES PATENTS

| | | |
|---|---|---|
| 1,718,663 | Ogden | June 25, 1929 |
| 2,444,880 | Robinson | July 6, 1948 |
| 2,467,811 | Cheeseman et al. | Apr. 19, 1949 |